United States Patent Office 3,053,566
Patented Sept. 11, 1962

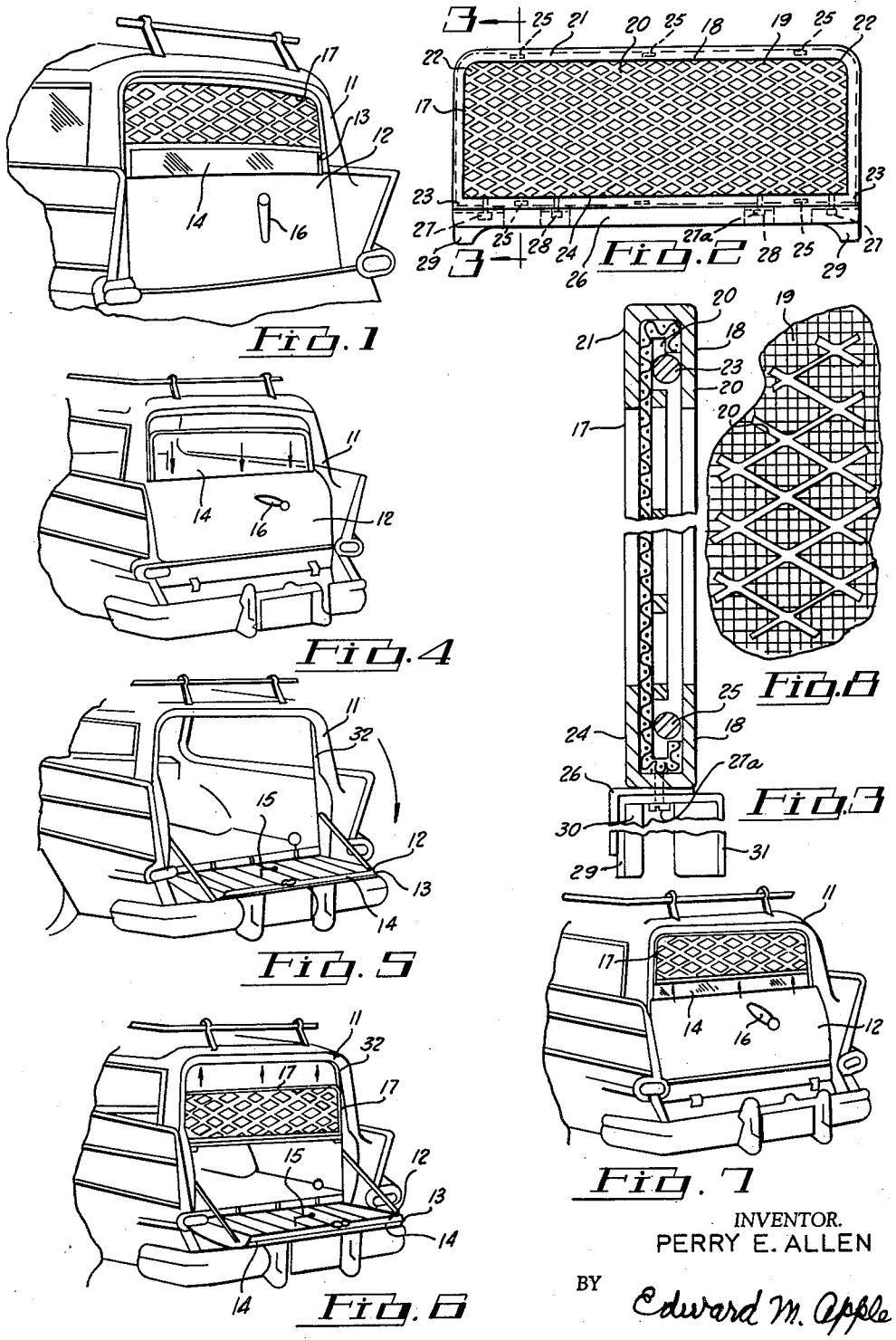

3,053,566
SCREEN FOR STATION WAGON
Perry E. Allen, 24170 Sherwood Court, Royal Oak, Mich.
Filed Dec. 23, 1959, Ser. No. 861,692
2 Claims. (Cl. 296—106)

This invention relates to automotive vehicles and has particular reference to a screen and guard for mounting in the rear opening of a station wagon, above the tailgate.

An object of the invention is to provide a protective screen and guard for the tailgate opening of a station wagon, which serves the purpose of protecting children and pets from falling through the open back window of the station wagon and enables the operator of the vehicle to lock up the station wagon and still enjoy the benefit of full ventilation in the vehicle, when the vehicle is parked for shopping, etc.

Another object of the invention is to provide a device of the character indicated, which protects the interior of the station wagon and its contents against theft, when the vehicle is parked with an open tailgate window.

Another object of the invention is to provide an integrated screen and guard member for a station wagon tailgate window which may be received in the rear window channel and be held in place and locked by the window glass.

Another object of the invention is to provide an integrated screen and guard of the character indicated, which is constructed and arranged so that when the glass of the tailgate window is in "down" position, there is sufficient room, between the screen and the glass, for opening the tailgate from inside the vehicle.

The foregoing and other objects and advantages will become more apparent as the description proceeds, reference being made from time to time to the accompanying drawing forming part of the within disclosure, in which drawing:

FIG. 1 is a fragmentary detail illustrating the tailgate end of a station wagon equipped with a device embodying the invention.

FIG. 2 is an enlarged plan view of one of the screens and guards removed from the vehicle.

FIG. 3 is a vertical section taken substantially on the line 3—3 of FIG. 2.

FIG. 4 is a view similar to FIG. 1, but showing the tailgate window glass in partly open position.

FIG. 5 is a view similar to FIG. 4 but showing the tailgate window glass entirely recessed in the tailgate and showing the tailgate in open position.

FIG. 6 is a view similar to FIG. 5, but showing the tailgate open and the screen and guard being inserted in the window opening.

FIG. 7 is a view similar to FIG. 1, but showing the manner in which the screen-guard is locked in place by the tailgate window glass.

FIG. 8 is an enlarged fragmentary detail showing the relation of the screen and expanded metal guard.

Referring now more particularly to the drawings, it will be understood that in the embodiment herein disclosed, the reference character 11 indicates the body of a conventional station wagon having a hinged tailgate 12, which is channeled as at 13 (FIGS. 5 and 6) to receive the window glass 14, which is reciprocable in the channels 13. The glass 14 may be raised and lowered in the channels 13 of the tailgate 12 from the inside by means of the crank 15 or from the outside by means of the crank 16. The elements just described are conventional with station wagons and form no part of the invention except as combined with the structure hereinafter described.

The structure embodying the invention consists of a combined screen and guard 17 (FIGS. 1, 2, 3, 6, and 7). The screen-guard 17 consists of a channel-like frame 18 in which is mounted a fine, mesh screen 19 (FIG. 2) which is reinforced and protected by an expanded metal guard 20. There are several ways in which the screen-guard may be assembled, but I prefer to form the frame 18 of 2 pieces, as shown in FIG. 2. The larger piece 21 of the frame is provided with round corners 22 and is cut as at 23 to receive corresponding cuts formed at the ends of the straight piece 24. The joints at the cuts 23 are secured together by L-shaped members (not shown) or by any suitable means. In assembling the screen-guard device, I first position the screen portion 19 on a flat surface, such as a table, and then superimpose the expanded metal portion 20 on the screen, and bend the edges of the screen over the edges of the expanded metal member 20, as shown in FIG. 3. The edges of this assembly are then inserted in the channel of the curved member 21 of the frame. Next, the straight portion 24 of the frame is placed in position and fastened to the member 21 as aforesaid. The screen and expanded metal layers are then drawn taut in the channel of the frame by means of locking dowels 25, which are press-fitted between the screen layer 19 and the edge of the frame 18, as shown in FIG. 3. The dowels 25 are of such length that they may enter the open spaces in the expanded metal layer 20. When the dowels 25 are pressed toward the closed end of the channel in the frame 18, the screen 19 and the expanded metal guard 20 are stretched taut and are locked firmly in position in the channel of the frame.

Secured to the bottom of the straight section 24 of the frame is an L-shaped member 26, which is secured to the member 24 by metal screws 27, or other suitable means. Superimposed on the member 26 and secured to it and the frame 18 by metal screws 27A are a pair of L-shaped brackets 28 and a pair of U-shaped brackets 29. The web of each U-shaped bracket 29 (FIG. 3) is slotted as at 30, so that the leg portions 31 (FIG. 3) of the brackets may be easily bent together, or be spread apart, to accommodate the thickness of the glass 14 of the tailgate window. The member 26 and the brackets 28 and 29, together form an interrupted channel for receiving the upper edge of the glass 14.

In order to install the screen-guard in the window opening, the glass 14 is first lowered into the tailgate 12, as suggested in FIG. 4. When the glass is completely lowered into the tailgate 12, the tailgate is opened as shown in FIG. 5. The screen-guard 17 is then inserted in the channels 32 formed in the body 11 for receiving the glass 14 of the tailgate window. The screen-guard 17 is then moved upwardly in the channels 32 as shown in FIG. 6. The tailgate 12 is then closed as shown in FIG. 7 and the glass 14 is moved upwardly so that the upper edge of the glass 14 is received in the members 26, 28, and 29. The glass 14 is then moved upwardly until the screen-guard 17 is moved to the uppermost position, as shown in FIGS. 1 and 7, where it is held securely and locked in position by means of the window locking members 15 and 16.

Having described my invention, what I claim and desire to secure by Letters Patent is:

1. A screen and guard combination to be received in the glass channel of a station wagon having a tail gate with a glass slidable therein, comprising a channel in cross section integral, rectangular frame, a layer of expanded metal forming a guard in said frame, a layer of fine mesh screen underlying said layer of expanded metal and having its edges extended over the edges of said expanded metal, and dowels in said frame channel for locking the edges of said expanded metal and said fine mesh screen against displacement, said dowels being of such length that they may enter the spaces in said expanded metal, whereby the overall thickness of said frame is no greater than the thickness of the glass in said tail gate.

2. The structure of claim 1, in which said frame is provided along the bottom edge with a continuous L-shaped in cross section member, there being superimposed on said L-shaped member at least one slotted, bendable, inverted U-shaped member, and means for securing said last named L-shaped and U-shaped members to each other, whereby the lower edge of said device may be secured to the upper edge of the glass of said tail gate.

References Cited in the file of this patent

UNITED STATES PATENTS

| | | |
|---|---|---|
| 332,655 | Hammill | Dec. 15, 1885 |
| 1,863,428 | Westerick | June 14, 1932 |
| 1,906,237 | Pousha et al. | May 2, 1933 |
| 1,914,228 | Woodruff | June 13, 1933 |
| 2,549,234 | Puffer | Apr. 17, 1951 |
| 2,793,907 | Hess et al. | May 28, 1957 |
| 2,799,530 | Drake | July 16, 1957 |
| 2,864,648 | Bland | Dec. 16, 1958 |
| 2,873,800 | Kogan | Feb. 17, 1959 |
| 2,983,547 | Moore | May 9, 1961 |